(12) United States Patent
     Perlade et al.

(10) Patent No.:      US 12,698,550 B2
(45) Date of Patent:          Aug. 4, 2026

(54) HOT ROLLED AND HEAT-TREATED STEEL SHEET AND METHOD OF MANUFACTURING THE SAME

(71) Applicant: ArcelorMittal, Luxembourg (LU)

(72) Inventors: Astrid Perlade, Le Ban-Saint-Martin (FR); Kangying Zhu, Metz (FR); Frédéric Kegel, Yutz (FR); Blandine Remy, Sanry les Vigy (FR)

(73) Assignee: ArcelorMittal, Luxembourg (LU)

( * ) Notice:    Subject to any disclaimer, the term of this patent is extended or adjusted under 35 U.S.C. 154(b) by 605 days.

(21) Appl. No.:    18/016,733

(22) PCT Filed:    Jul. 12, 2021

(86) PCT No.:    PCT/IB2021/056247
     § 371 (c)(1),
     (2) Date:    Jan. 18, 2023

(87) PCT Pub. No.: WO2022/018571
     PCT Pub. Date: Jan. 27, 2022

(65) Prior Publication Data
     US 2023/0287547 A1      Sep. 14, 2023

(30) Foreign Application Priority Data
     Jul. 24, 2020    (WO) .................. PCT/IB2020/057009

(51) Int. Cl.
     *C22C 38/14*          (2006.01)
     *B32B 7/05*           (2019.01)
                           (Continued)
(52) U.S. Cl.
     CPC ............... *C22C 38/14* (2013.01); *B32B 7/05* (2019.01); *B32B 15/011* (2013.01); *C21D 6/005* (2013.01);
                           (Continued)

(58) Field of Classification Search
     CPC ................ C21D 1/26; C21D 2211/001; C21D 2211/004; C21D 2211/005;
                           (Continued)

(56)                 References Cited

U.S. PATENT DOCUMENTS 10,633,727 B2      4/2020   Garza-Martinez et al.
     2006/0162824 A1*   7/2006   Merwin ............... C21D 8/0205
                                                              148/653
                           (Continued)

FOREIGN PATENT DOCUMENTS

CN        107858586  A       3/2018
     CN        108546812      *   9/2018
                           (Continued)

OTHER PUBLICATIONS

Search Report of PCT/IB2021/056233 dated Oct. 8, 2021 and International Report on Patentability.
                           (Continued)

*Primary Examiner* — Nicholas A Wang
(74) *Attorney, Agent, or Firm* — Davidson Kappel LLC

(57)                 ABSTRACT

A hot rolled and heat-treated steel sheet, made of a steel having a composition including, by weight percent: C: 0.03-0.18%, Mn: 6.0-11.0%, Mo: 0.05-0.5%, B: 0.0005-0.005%, S≤0.010%, P≤0.020%, N≤0.008%, and including optionally one or more of the following elements, in weight percentage: Al<3%, Si≤1.20%, Ti≤0.050%, Nb≤0.050%, Cr≤0.5%, V≤0.2%, the remainder of the composition being iron and unavoidable impurities resulting from the smelting, the steel sheet having a microstructure including, in surface fraction, from 10% to 60% of retained austenite, from 40% to 90% of ferrite, less than 5% of martensite, carbides below 0.8%, and an inhomogeneous repartition of manganese, characterized by a manganese distribution with a slope above or equal to −40.

15 Claims, 1 Drawing Sheet

(51) Int. Cl.

| | |
|---|---|
| *B32B 15/01* | (2006.01) |
| *C21D 6/00* | (2006.01) |
| *C21D 8/02* | (2006.01) |
| *C21D 8/0221* | (2026.01) |
| *C21D 8/0247* | (2026.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |

(52) U.S. Cl.
CPC ............. *C21D 8/02* (2013.01); *C21D 8/0226* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C21D 2211/001* (2013.01); *C21D 2211/004* (2013.01); *C21D 2211/005* (2013.01); *C21D 2211/008* (2013.01)

(58) Field of Classification Search
CPC ............. C21D 2211/008; C21D 6/005; C21D 8/0205; C21D 8/0226; C21D 8/0263; C21D 9/46; C22C 38/001; C22C 38/002; C22C 38/02; C22C 38/04; C22C 38/06; C22C 38/12; C22C 38/14; C22C 38/32; C22C 38/38; C22C 38/22; C22C 38/26; C22C 38/28
See application file for complete search history.

(56) References Cited

U.S. PATENT DOCUMENTS

| | | | |
|---|---|---|---|
| 2016/0312323 A1 | 10/2016 | Rana et al. | |
| 2018/0363088 A1* | 12/2018 | Tsuzumi | C22C 38/22 |
| 2019/0264297 A1 | 8/2019 | Palzer et al. | |
| 2021/0317554 A1 | 10/2021 | Ryu et al. | |
| 2022/0002847 A1 | 1/2022 | Krizan et al. | |

FOREIGN PATENT DOCUMENTS

| | | | |
|---|---|---|---|
| CN | 108546812 A | | 9/2018 |
| CN | 110066964 A | | 7/2019 |
| CN | 111218621 A | | 6/2020 |
| EP | 3336212 A1 | | 6/2018 |
| EP | 3492618 A1 | | 6/2019 |
| JP | H05230530 A | | 9/1993 |
| JP | 2019014933 | * | 1/2019 |
| JP | 2019014933 A | | 1/2019 |
| JP | 2019039037 A | | 3/2019 |
| JP | 2020500262 A | | 1/2020 |
| KR | 20040059293 A | | 7/2004 |
| KR | 20170075853 A | | 7/2017 |
| KR | 20200024398 A | | 3/2020 |
| WO | WO2017026125 A1 | | 2/2017 |

| | | | |
|---|---|---|---|
| WO | WO 2017/212885 A1 | 12/2017 |
| WO | WO2018054787 A1 | 3/2018 |
| WO | WO2019122961 A1 | 6/2019 |
| WO | WO 2019123245 A1 | 6/2019 |
| WO | WO 2019134102 A1 | 7/2019 |
| WO | WO 2019155014 A1 | 8/2019 |
| WO | WO2020011638 | 1/2020 |
| WO | WO2020050573 A1 | 3/2020 |
| WO | WO 2022/018562 A1 | 1/2022 |
| WO | WO 2022/018563 A1 | 1/2022 |
| WO | WO 2022/018565 A1 | 1/2022 |
| WO | WO 2022/018566 A1 | 1/2022 |
| WO | WO 2022/018567 A1 | 1/2022 |
| WO | WO 2022/018568 A1 | 1/2022 |
| WO | WO 2022/018569 A1 | 1/2022 |
| WO | WO 2022/018571 A1 | 1/2022 |

OTHER PUBLICATIONS

Search Report of PCT/IB2021/056243 dated Oct. 8, 2021 and International Report on Patentability.
Search Report of PCT/IB2021/056235 dated Sep. 8, 2021 and International Report on Patentability.
Search Report of PCT/IB2021/056241 dated Oct. 4, 2021 and International Report on Patentability.
Search Report of PCT/IB2021/056237 dated Aug. 4, 2021 and International Report on Patentability.
Search Report of PCT/IB2021/056245 dated Aug. 4, 2021 and International Report on Patentability.
Search Report of PCT/IB2021/056244 dated Aug. 24, 2021 and International Report on Patentability.
Search Report of PCT/IB2021/056247 dated Oct. 4, 2021 and International Report on Patentability.
Lee et al.: "Observation of the TWIP+TRIP Plasticity-Enhancement Mechanism in Al-Added 6 Wt PCT Medium Mn Steel," Metallurgical and Materials Transactions A, vol. 46A, Jun. 2015, 2356-2363.
U.S. Appl. No. 18/016,396, filed Jan. 16, 2023 which is a national phase of PCT/IB2021/056233 which was published as WO 2022/018562 A1 on Jan. 27, 2022.
U.S. Appl. No. 18/016,403, filed Jan. 16, 2023A02 which is a national phase of PCT/IB2021/056235 which published as WO 2022/018563 A1 on Jan. 27, 2022.
U.S. Appl. No. 18/016,543, filed Jan. 17, 2023 which is a national phase of PCT/IB2021/056243 which was published as WO 2022/018567 A1 on Jan. 27, 2022.
U.S. Appl. No. 18/016,572, filed Jan. 17, 2023 which is a national phase of PCT/IB2021/056241 which was published as WO 2022/018566 A1 on Jan. 27, 2022.
U.S. Appl. No. 18/016,595, filed Jan. 17, 2023 which is a national phase of PCT/IB2021/056237 which was published as WO 2022/018565 A1 on Jan. 27, 2022.
U.S. Appl. No. 18/016,799, filed Jan. 18, 2023 which is a national phase of PCT/IB2021/056244 which was published as WO 2022/018568 A1 on Jan. 27, 2022.
U.S. Appl. No. 18/016,837, filed Jan. 18, 2023 which is a national phase of PCT/IB2021/056245 which was published as WO 2022/018569 A1 on Jan. 27, 2022.
U.S. Appl. No. 18/016,733, filed Jan. 18, 2023 which is a national phase of PCT/IB2021/056247 which was published as WO 2022/018571 A1 on Jan. 27, 2022.

* cited by examiner

Mn Content

Trial 1                          Trial 4

HOT ROLLED AND HEAT-TREATED STEEL SHEET AND METHOD OF MANUFACTURING THE SAME

The present invention relates to a high strength steel sheet having good weldability properties and to a method to obtain such steel sheet.

BACKGROUND

To manufacture various items such as parts of body structural members and body panels for automotive vehicles, it is known to use sheets made of DP (Dual Phase) steels or TRIP (Transformation Induced Plasticity) steels.

SUMMARY OF THE INVENTION

One of the major challenges in the automotive industry is to decrease the weight of vehicles in order to improve their fuel efficiency in view of the global environmental conservation, without neglecting the safety requirements. To meet these requirements, new high strength steels are continuously developed by the steelmaking industry, to have sheets with improved yield and tensile strengths, and good ductility and formability.

One of the developments made to improve mechanical properties is to increase content of manganese in steels. The presence of manganese helps to increase ductility of steels thanks to the stabilization of austenite. But these steels present weaknesses of brittleness. To overcome this problem, elements as boron are added. These boron-added chemistries are very tough at the hot-rolled stage but the hot band is too hard to be further processed. The most efficient way to soften the hot band is batch annealing, but it leads to a loss of toughness.

In addition to these mechanical requirements, such steel sheets have to show a good resistance to liquid metal embrittlement (LME). Zinc or Zinc-alloy coated steel sheets are very effective for corrosion resistance and are thus widely used in the automotive industry. However, it has been experienced that arc or resistance welding of certain steels can cause the apparition of particular cracks due to a phenomenon called Liquid Metal Embrittlement ("LME") or Liquid Metal Assisted Cracking ("LMAC"). This phenomenon is characterized by the penetration of liquid Zn along the grain boundaries of underlying steel substrate, under applied stresses or internal stresses resulting from restraint, thermal dilatation or phases transformations. It is known that adding elements like carbon or silicon is detrimental for LME resistance.

The automotive industry usually assesses such resistance by limiting the upper value of a so-called LME index calculated according to the following equation:

$$\text{LME index}=C\ \%+Si\ \%/4,$$

wherein C % and Si % stands respectively for the weight percentages of carbon and silicon in the steel.

An object of the present invention is to provide a hot rolled and annealed steel sheet having high toughness with Charpy impact energy at 20° C. higher than 0.4 J/mm² together with good weldability properties.

Preferably, the hot rolled and annealed steel sheet according to the invention has a LME index of 0.36 or less.

Preferably, the hot rolled and annealed steel according to the invention has a carbon equivalent Ceq lower than 0.4, the carbon equivalent being defined as $$Ceq=C\ \%+Si\ \%/55+Cr\ \%/20+Mn\ \%/19-Al\ \%/18+2.2P\ \%-3.24B\ \%-0.133*Mn\ \%*Mo\ \%$$

with elements being expressed by weight percent.

The present invention provides a hot rolled and heat-treated steel sheet, made of a steel having a composition comprising, by weight percent:

C: 0.03-0.18%
Mn: 6.0-11.0%
Mo: 0.05-0.5%
B: 0.0005-0.005%
 S≤0.010%
 P≤0.020%
 N≤0.008%
and comprising optionally one or more of the following elements, in weight percentage:
 Al<3%
 Si≤1.20%
 Ti≤0.050%
 Nb≤0.050%
 Cr≤0.5%
the remainder of the composition being iron and unavoidable impurities resulting from the smelting,
said steel sheet having a microstructure comprising, in surface fraction,
from 10% to 60% of retained austenite,
from 40% to 90% of ferrite,
less than 5% of martensite,
carbides below 0.8%, and
an inhomogeneous repartition of manganese, characterized by a manganese distribution with a slope above or equal to −40.

DETAILED DESCRIPTION

Figure 1:
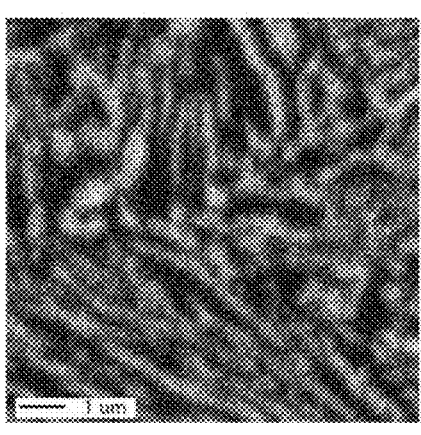
FIG. 1 shows a section of the hot rolled and heat-treated steel sheet of trial 1 and trial 4.
Figure 1:
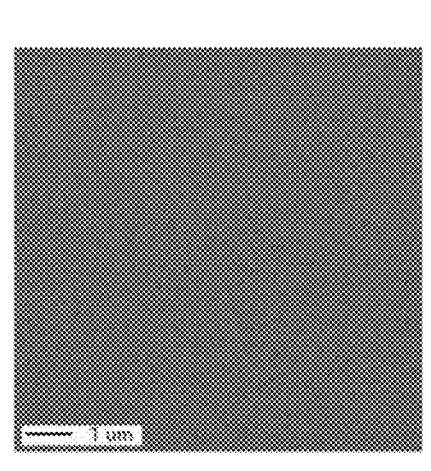
Figure 1:
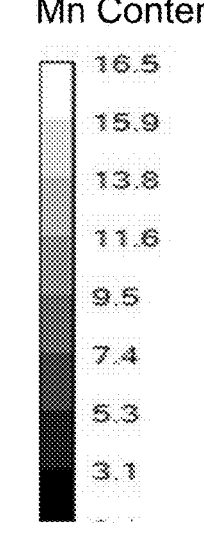

The invention will now be described in detail and illustrated by examples without introducing limitations.

The composition of the steel according to the invention will now be described, the content being expressed in weight percent.

According to the invention the carbon content is from 0.03% to 0.18% to ensure a satisfactory strength and good weldability properties. Above 0.18% of carbon, weldability of the steel sheet and the resistance to LME may be reduced. The temperature of the soaking depends in particular on carbon content: the higher the carbon content, the lower the soaking temperature to stabilize austenite. If the carbon content is lower than 0.03%, the austenite fraction is not stabilized enough to obtain, after soaking, the desired tensile strength and elongation. In a preferred embodiment of the invention, the carbon content is from 0.05% to 0.15%. In another preferred embodiment of the invention, the carbon content is from 0.07% to 0.12%.

The manganese content is from 6.0% to 11.0%. Above 11.0% of addition, weldability of the steel sheet may be reduced, and the productivity of parts assembly can be reduced. Moreover, the risk of central segregation increases to the detriment of the mechanical properties. As the temperature of soaking depends on manganese content too, the minimum of manganese is defined to stabilize austenite, to obtain, after soaking, the targeted microstructure and properties. Preferably, the manganese content is from 6% to 9.0%.

According to the invention, aluminium content is below 3% to decrease the manganese segregation during casting. Aluminium is a very effective element for deoxidizing the steel in the liquid phase during elaboration. Above 3% of addition, the weldability of the steel sheet may be reduced, so as castability. Moreover, the higher the aluminium content, the higher the soaking temperature to stabilize austenite. Aluminium is preferably added at least up to 0.2% to improve product robustness by enlarging the intercritical range, and to improve weldability. Moreover, aluminium can be added to avoid the occurrence of inclusions and oxidation problems. In a preferred embodiment of the invention, the aluminium content is from 0.2% to 2.5% and more preferably from 0.5 and 2.2%.

Molybdenum content is from 0.05% to 0.5% in order to decrease the manganese segregation during casting. Moreover, an addition of at least 0.05% of molybdenum provides resistance to brittleness. Above 0.5%, the addition of molybdenum is costly and ineffective in view of the properties which are required. In a preferred embodiment of the invention, the molybdenum content is from 0.1% to 0.3%.

According to the invention, the boron content is from 0.0005% to 0.005% in order to improve the toughness and the spot weldability of the hot rolled steel sheet. Above 0.005%, the formation of borocarbides at the prior austenite grain boundaries is promoted, making the steel more brittle. In a preferred embodiment of the invention, the boron content is from 0.001% to 0.003%.

Optionally some elements can be added to the composition of the steel according to the invention.

The maximum addition of silicon content is limited to 1.20% in order to improve the resistance to LME. In addition, this low silicon content makes it possible to simplify the process by eliminating the step of pickling the hot rolled steel sheet before the hot band annealing. Preferably the maximum silicon content added is 1.0%.

Titanium can be added up to 0.050% to provide precipitation strengthening.

Preferably, a minimum of 0.010% of titanium is added in addition of boron to protect boron against the formation of BN.

Niobium can optionally be added up to 0.050% to refine the austenite grains during hot-rolling and to provide precipitation strengthening. Preferably, the minimum amount of niobium added is 0.010%.

Chromium and vanadium can optionally be respectively added up to 0.5% and 0.2% to provide improved strength.

The remainder of the composition of the steel is iron and impurities resulting from the smelting. In this respect, P, S and N at least are considered as residual elements which are unavoidable impurities. Their content is less than or equal to 0.010% for S, less than or equal to 0.020% for P and less than or equal to 0.008% for N.

The microstructure of the hot rolled and heat-treated steel sheet according to the invention will now be described.

A hot rolled steel sheet with a composition according to the invention undergoes an intercritical annealing, during which a microstructure comprising 10 to 60% of austenite, 40 to 90% of ferrite, a fraction of carbides below 0.8% and less than 5% of martensite is formed.

The austenite that is formed during such intercritical annealing is enriched in carbon and manganese. More precisely, areas with manganese content higher than nominal value and areas with manganese content lower than nominal value are formed, creating a heterogeneous distribution of manganese. Carbon co-segregate with manganese accordingly. This manganese heterogeneity is measured thanks to the slope of manganese distribution which has to be above or equal to −40, as shown on FIG. 2 and explained later.

Ferrite is present in an amount of 40 to 90% and is formed during the intercritical annealing.

Fresh martensite can be formed during the cooling following the intercritical annealing, from the destabilization of a part of austenite, less rich in carbon and manganese. This constituent of the microstructure is however not desired and its fraction has to remain below 5%.

Finally, the hot rolled steel and heat treated steel sheet contains less than 0.8% of carbides, which allows obtaining a good toughness, i.e. a Charpy impact energy at 20° C. higher than 0.4 J/mm$^2$ measured according to Standard ISO 148-1:2006 (F) and ISO 148-1:2017 (F). In a preferred embodiment, the amount of carbides is 0.6% or less or even preferred 0.5% or less.

According to the invention, the hot rolled and annealed steels sheet has a carbon equivalent Ceq lower than 0.4 to improve weldability. The carbon equivalent is defined as Ceq=C %+Si %/55+Cr %/20+Mn %/19−Al %/18+2.2P %−3.24B %−0.133*Mn %*Mo % with elements being expressed by weight percent.

The hot rolled steel sheets according to the invention can be produced by any appropriate manufacturing method and the person skilled in the art can define one. It is however preferred to use the method according to the invention comprising the following steps:

A semi-product able to be further hot-rolled, is provided with the steel composition described above. The semi-product is heated to a temperature from 1150° C. to 1300° C., to ease hot rolling, with a final hot rolling temperature FRT from 800° C. to 1000° C. Preferably, the FRT is from 850° C. to 950° C.

The hot-rolled steel is then cooled and coiled at a temperature $T_{coil}$ from 20° C. to 600° C. The hot rolled steel sheet is then cooled to room temperature and can be pickled.

The hot rolled steel sheet is then heated up to an annealing temperature $T_{HBA}$ between Tc and 680° C. Tc is calculated through the below formula, which is valid for manganese contents above 4 wt %:

$$Tc=Tec-(Mn \%-4)/C \%$$

Tec being the carbides dissolution temperature at equilibrium condition that can be determined through thermodynamic calculations done with the use of a software like Thermo-Calc® and Mn % and C % being the weight nominal composition in manganese and carbon of the steel.

Preferably the temperature $T_{HBA}$ is from 580° C. to 680° C. The steel sheet is maintained at said temperature $T_{HBA}$ for a holding time $t_{HBA}$ from 0.1 to 120 h to promote manganese diffusion and formation of inhomogeneous manganese distribution.

$T_{HBA}$ is chosen to obtain after cooling, 10 to 60% of austenite, 40 to 90% of ferrite and less than 5% martensite, the fraction of carbides being maintained below 0.8%. In particular, the selection of the appropriate time and temperature of such intercritical annealing must consider the maximum carbide fractions that can be tolerated according to the invention, keeping in mind that increasing $T_{HBA}$ limits carbide precipitation.

Regarding chemical composition, the higher the amount of carbon and aluminium in the steel, the greater the concentration of carbides for a given temperature. This means that for carbon and aluminium contents in the upper part of the claimed ranges, $T_{HBA}$ must be increased to limit carbides precipitation accordingly.

Moreover, the lower the amount of manganese in the steel, the higher the carbide concentration for a given temperature. This means that for manganese content in the lower part of the claimed range, $T_{HBA}$ must be increased to limit carbides precipitation accordingly.

The hot rolled and heat-treated steel sheet is then cooled to room temperature and can be pickled to remove oxidation.

The invention will be now illustrated by the following examples, which are by no way limitative.

EXAMPLES

Eleven grades, whose compositions are gathered in table 1, were cast in semi-products and processed into steel sheets The tested compositions are gathered in the following table wherein the element contents are expressed in weight percent.

TABLE 1

| | | | | | | | | | | | | Tec | | Ae1 | Ae3 |
|---|---|---|---|---|---|---|---|---|---|---|---|---|---|---|---|
| Steel | C | Mn | Al | Mo | B | S | P | N | Si | Nb | Ti | (° C.) | Ceq | (° C.) | (° C.) |
| A | 0.07 | 7.9 | 0.90 | 0.32 | 0.002 | 0.002 | 0.011 | 0.003 | 0 | 0.032 | 0.015 | 605 | 0.15 | 510 | 725 |
| B | 0.09 | 9.5 | 1.69 | 0.33 | 0.002 | 0.002 | 0.010 | 0.003 | 0 | 0.031 | 0.015 | 605 | 0.15 | 530 | 705 |
| C | 0.15 | 7.7 | 0.96 | 0.22 | 0.003 | 0.002 | 0.012 | 0.003 | 0.02 | 0 | 0.018 | 625 | 0.33 | 540 | 715 |
| D | 0.16 | 7.7 | 0.96 | 0.22 | 0.003 | 0.002 | 0.012 | 0.003 | 0.81 | 0 | 0.018 | 635 | 0.35 | 550 | 735 |
| E | 0.19 | 7.6 | 0.97 | 0.22 | 0.003 | 0.002 | 0.013 | 0.003 | 0.98 | 0 | 0.018 | 650 | 0.38 | 540 | 730 |
| F | 0.12 | 9.0 | 0.94 | 0.21 | 0.003 | 0.004 | 0.013 | 0.002 | 0.02 | 0 | 0.021 | 595 | 0.34 | 520 | 695 |
| G | 0.13 | 9.0 | 0.95 | 0.21 | 0.003 | 0.004 | 0.013 | 0.002 | 0.52 | 0 | 0.021 | 600 | 0.36 | 520 | 695 |
| H | 0.21 | 4.0 | 0.03 | 0.001 | 0 | 0.001 | 0.011 | 0.003 | 1.50 | 0 | 0 | 675 | 0.47 | 610 | 765 |
| I | 0.21 | 4.9 | 0.02 | 0 | 0 | 0.001 | 0.020 | 0.002 | 0.01 | 0 | 0 | 645 | 0.51 | 550 | 720 |
| J | 0.20 | 5.0 | 1.03 | 0 | 0 | 0.002 | 0.022 | 0.002 | 0.01 | 0 | 0 | 650 | 0.49 | 540 | 780 |
| K | 0.20 | 4.8 | 0.02 | 0 | 0 | 0.001 | 0.020 | 0.004 | 1.51 | 0 | 0 | 665 | 0.52 | 580 | 750 |

Ae1, Ae3 and Tec temperatures have been determined through thermodynamic calculations done with the use of a software like Thermo-Calc®.

Steel semi-products, as cast, were reheated at 1200° C., hot rolled and then coiled. The hot rolled and coiled steel sheets are then heat treated at a temperature $T_{HBA}$ and maintained at said temperature for a holding time $t_{HBA}$. The following specific conditions to obtain the hot rolled and heat-treated steel sheets were applied:

TABLE 2

Process parameters of the hot rolled and heat-treated steel sheets

| | | Hot rolling | | Hot band annealing (HBA) | | Tc |
|---|---|---|---|---|---|---|
| Trials | Steel | FRT (° C.) | Coiling (° C.) | $T_{HBA}$(° C.) | $t_{HBA}$(h) | (° C.) |
| 1 | A | 900 | 450 | 640 | 10 | 547 |
| 2 | A | 850 | 450 | 630 | 40 | 547 |
| 3 | A | 850 | 450 | 650 | 40 | 547 |
| 4 | A | 850 | 450 | — | — | 547 |
| 5 | B | 900 | 450 | 640 | 10 | 544 |
| 6 | C | 850 | 450 | 514 | 15 | 600 |
| 7 | C | 850 | 450 | 547 | 15 | 600 |
| 8 | C | 850 | 450 | 589 | 15 | 600 |
| 9 | C | 850 | 450 | 616 | 15 | 600 |
| 10 | C | 850 | 450 | 630 | 15 | 600 |
| 11 | C | 850 | 450 | 630 | 40 | 600 |
| 12 | C | 850 | 450 | 650 | 40 | 600 |
| 13 | D | 850 | 450 | 558 | 15 | 611 |
| 14 | D | 850 | 450 | 582 | 15 | 612 |
| 15 | D | 850 | 450 | 602 | 15 | 612 |
| 16 | D | 850 | 450 | 630 | 15 | 612 |
| 17 | D | 850 | 450 | 630 | 40 | 612 |

TABLE 2-continued

| | | Hot rolling | | Hot band annealing (HBA) | | Tc |
| Trials | Steel | FRT (° C.) | Coiling (° C.) | $T_{HBA}$(° C.) | $t_{HBA}$(h) | (° C.) |
|---|---|---|---|---|---|---|
| 18 | D | 850 | 450 | 650 | 40 | 612 |
| 19 | E | 850 | 450 | 592 | 15 | 631 |
| 20 | E | 850 | 450 | 624 | 15 | 631 |
| 21 | E | 850 | 450 | 630 | 15 | 631 |
| 22 | F | 850 | 450 | 521 | 15 | 554 |
| 23 | F | 850 | 450 | 558 | 15 | 554 |
| 24 | F | 850 | 450 | 568 | 15 | 554 |
| 25 | F | 850 | 450 | 611 | 15 | 554 |
| 26 | F | 850 | 450 | 631 | 15 | 554 |
| 27 | G | 850 | 450 | 529 | 15 | 562 |
| 28 | G | 850 | 450 | 538 | 15 | 562 |
| 29 | G | 850 | 450 | 568 | 15 | 562 |
| 30 | G | 850 | 450 | 586 | 15 | 562 |
| 31 | G | 850 | 450 | 624 | 15 | 562 |
| 32 | G | 850 | 450 | 631 | 15 | 562 |
| 33 | H | 900 | 30 | 600 | 5 | 675 |
| 34 | I | 930 | 580 | 600 | 5 | 641 |
| 35 | J | 930 | 580 | 600 | 5 | 645 |
| 36 | K | 930 | 450 | 600 | 5 | 661 |

Underlined values: parameters which do not allow to obtain the targeted properties The hot rolled and heat-treated steel sheets were analyzed, and the corresponding properties are gathered in table 3.

The surface fractions of phases in the microstructure are determined through the following method: a specimen is cut from the hot rolled and annealed steel sheet, polished and etched with a reagent known per se, to reveal the microstructure. The section is afterwards examined through scanning electron microscope, for example with a Scanning Electron Microscope with a Field Emission Gun ("FEG-SEM") at a magnification greater than 5000×, in secondary electron mode.

The determination of the surface fraction of ferrite is performed thanks to SEM observations after Nital or Picral/Nital reagent etching.

The determination of the volume fraction of retained austenite is performed thanks to X-ray diffraction.

The fraction of carbides is determined thanks to a section of sheet examined through Scanning Electron Microscope with a Field Emission Gun ("FEG-SEM") and image analysis at a magnification greater than 15000×.

TABLE 3

Microstructure and properties of the hot rolled and heat-treated steel sheet

| Trials | Ferrite (%) | Austenite (%) | Martensite (%) | Carbides (%) |
|---|---|---|---|---|
| 1 | 66.0 | 34 | 0 | 0.0 |
| 2 | 65.0 | 35 | 0 | 0.0 |
| 3 | 57.0 | 43 | 0 | 0.0 |
| 4 | 0 | 0 | 100 | 0.0 |
| 5 | 54.0 | 46 | 0 | 0.0 |
| 6 | 95.0 | 3 | 0 | 2.0 |
| 7 | 93.1 | 5 | 0 | 1.9 |
| 8 | 84.1 | 15 | 0 | 0.9 |
| 9 | 73.4 | 26 | 0 | 0.6 |
| 10 | 67.5 | 32 | 0 | 0.5 |
| 11 | 60.5 | 39 | 0 | 0.5 |
| 12 | 53.9 | 46 | 0 | 0.1 |
| 13 | 93.2 | 5 | 0 | 1.8 |
| 14 | 88.9 | 10 | 0 | 1.1 |
| 15 | 81.1 | 18 | 0 | 0.9 |
| 16 | 69.4 | 30 | 0 | 0.6 |
| 17 | 63.4 | 36 | 0 | 0.6 |

TABLE 3-continued

Microstructure and properties of the hot rolled and heat-treated steel sheet

| Trials | Ferrite (%) | Austenite (%) | Martensite (%) | Carbides (%) |
|---|---|---|---|---|
| 18 | 55.8 | 44 | 0 | 0.2 |
| 19 | 84.4 | 14 | 0 | 1.6 |
| 20 | 72.8 | 26 | 0 | 1.2 |
| 21 | 68.9 | 30 | 0 | 1.1 |
| 22 | 93.4 | 5 | 0 | 1.6 |
| 23 | 79.4 | 20 | 0 | 0.6 |
| 24 | 76.6 | 23 | 0 | 0.4 |
| 25 | 67.0 | 33 | 0 | 0 |
| 26 | 60.0 | 40 | 0 | 0 |
| 27 | 91.4 | 7 | 0 | 1.6 |
| 28 | 87.2 | 12 | 0 | 0.8 |
| 29 | 81.4 | 18 | 0 | 0.6 |
| 30 | 71.7 | 28 | 0 | 0.3 |
| 31 | 60.0 | 40 | 0 | 0 |
| 32 | 58.0 | 42 | 0 | 0 |
| 33 | 97.2 | 0 | 0 | 2.8 |
| 34 | 94.2 | 3 | 0 | 2.8 |
| 35 | 97.3 | 0 | 0 | 2.7 |
| 36 | 97.2 | 0 | 0 | 2.8 |

Underlined values: do not match the targeted values

The slope of the manganese distribution and the Charpy impact energy at 20° C. were determined.

The Charpy impact energy is measured according to Standard ISO 148-1:2006 (F) and ISO 148-1:2017 (F).

The heat treatment of the hot rolled steel sheet allows manganese to diffuse in austenite: the repartition of manganese is heterogeneous with areas with low manganese content and areas with high manganese content. This manganese heterogeneity helps to achieve mechanical properties and can be measured thanks to the manganese distribution.

FIG. 1 represents a section of the hot rolled and heat-treated steel sheet of trial 1 and trial 4. The black area corresponds to area with lower amount of manganese, the grey area corresponds to a higher amount of manganese.

This figure is obtained through the following method: a specimen is cut at ¼ thickness from the hot rolled and heat-treated steel sheet and polished.

The section is afterwards characterized through electron probe micro-analyzer, with a Field Emission Gun ("FEG") at a magnification greater than 10000× to determine the manganese amounts. Three maps of 10 μm*10 μm of different parts of the section were acquired. These maps are composed of pixels of 0.01 μm². Manganese amount in weight percent is calculated in each pixel and is then plotted on a curve representing the accumulated area fraction of the three maps as a function of the manganese amount.

Figure 2:
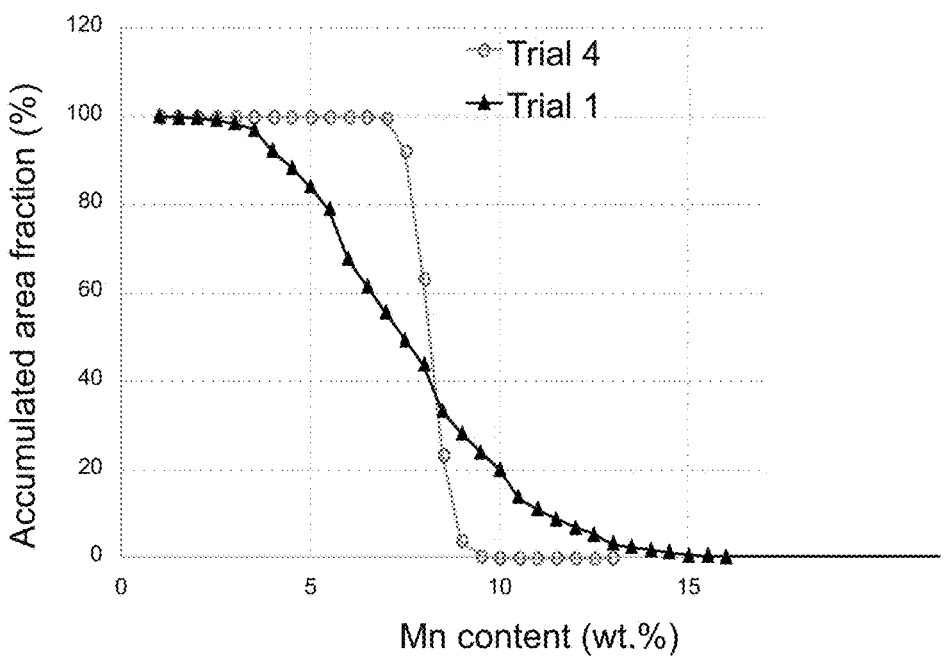
FIG. 2 shows a plotted curve for trial 1 and trial 4 of accumulated area fraction with respect to Mn content.

This curve is plotted in FIG. 2 for trial 1 and trial 4: 100% of the sheet section contains more than 1% of manganese. For trial 1, 20% of the sheet section contains more than 10% of manganese.

The slope of the curve obtained is then calculated between the point representing 80% of accumulated area fraction and the point representing 20% of accumulated area fraction. For trial 1, this slope is higher than −40, showing that the repartition of manganese is heterogeneous, with areas with low manganese content and areas with high manganese content.

On the contrary, for trial 4, the absence of heat treatment after hot rolling implies that the repartition of manganese is not heterogeneous, which can be seen by the value of the slope of the manganese distribution lower than −40.

| Trials | Slope of the Mn distribution | Charpy energy (J/mm²) |
|---|---|---|
| 1 | −13 | 1.22 |
| 2 | −24.9 | 1.26 |
| 3 | −27 | 1.30 |
| 4 | −69 | 0.91 |
| 5 | −12.4 | 1.20 |
| 6 | −60 | 0.19 |
| 7 | −55 | 0.25 |
| 8 | −40 | 0.32 |
| 9 | −25 | 0.47 |
| 10 | −19.5 | 0.53 |
| 11 | −26.6 | 0.68 |
| 12 | −28 | 0.78 |
| 13 | −55 | 0.19 |
| 14 | −45 | 0.26 |
| 15 | −35 | 0.32 |
| 16 | −20.5 | 0.42 |
| 17 | −22.4 | 0.51 |
| 18 | −25 | 0.65 |
| 19 | −40 | 0.19 |
| 20 | −25 | 0.26 |
| 21 | −22 | 0.32 |
| 22 | −55 | 0.32 |
| 23 | −30 | 0.46 |
| 24 | −25 | 0.49 |
| 25 | −19 | 0.58 |
| 26 | −13.5 | 0.62 |
| 27 | −50 | 0.32 |
| 28 | −44 | 0.38 |
| 29 | −35 | 0.44 |
| 30 | −23 | 0.44 |
| 31 | −15 | 0.53 |
| 32 | −13.5 | 0.63 |
| 33 | −60 | 0.21 |
| 34 | −60 | 0.12 |
| 35 | −60 | 0.13 |
| 36 | −60 | 0.05 |

Underlined values: do not match the targeted values.

For trials 6 and 7, the $T_{HBA}$ temperature is significantly lower than Tc, leading to the formation of too much carbides, which results in the increase in strength but decrease in ductility. Moreover, the small volume fraction of austenite (<10%) is not sufficient to cover all grain boundaries which are very rich in manganese, leading to the grain boundary embrittlement, and thus the degradation of toughness.

For trial 8, performed at relatively higher $T_{HBA}$ temperature (but still lower than Tc), carbides tend to grow along prior austenite grain boundaries, which is harmful to toughness.

Trials 13, 14, 15, 19, 20, 21, 22, 27, 28, 33, 34, 35, 36 show similar trends and include too much carbides as well.

Weldability properties of the obtained hot rolled and heat-treated steel sheet were determined and gathered in the following table.

Spot welding in standard ISO 18278-2 condition has been done on the hot rolled and annealed steel sheets, which were pickled before welding.

In the test used, the samples are composed of two sheets of steel in the form of cross welded equivalent. A force is applied so as to break the weld point. This force, known as cross tensile Strength (CTS), is expressed in daN. It depends on the diameter of the weld point and the thickness of the metal, that is to say the thickness of the steel and the metallic coating. It makes it possible to calculate the coefficient α which is the ratio of the value of CTS on the product of the diameter of the welded point multiplied by the thickness of the substrate. This coefficient is expressed in daN/mm².

The resistance spot welds joining the first sheet to the second sheet are characterized by a high resistance in cross-tensile test defined by an α value of at least 30 daN/mm2.

TABLE 4

Weldability properties of the hot rolled and heat-treated steel sheet

| Trials | α (daN/mm²) | LME index |
|---|---|---|
| 1 | 60 | 0.07 |
| 2 | 60 | 0.07 |
| 3 | 60 | 0.07 |
| 4 | 60 | 0.07 |
| 5 | 63 | 0.16 |
| 6 | 40 | 0.16 |
| 7 | 40 | 0.16 |
| 8 | 40 | 0.16 |
| 9 | 40 | 0.16 |
| 10 | 40 | 0.16 |
| 11 | 40 | 0.16 |
| 12 | 40 | 0.16 |
| 13 | 40 | 0.36 |
| 14 | 40 | 0.36 |
| 15 | 40 | 0.36 |
| 16 | 40 | 0.36 |
| 17 | 40 | 0.36 |
| 18 | 40 | 0.36 |
| 19 | 28 | 0.44 |
| 20 | 28 | 0.44 |
| 21 | 28 | 0.44 |
| 22 | 48 | 0.13 |
| 23 | 48 | 0.13 |
| 24 | 48 | 0.13 |
| 25 | 48 | 0.13 |
| 26 | 48 | 0.13 |
| 27 | 46 | 0.26 |
| 28 | 46 | 0.26 |
| 29 | 46 | 0.26 |
| 30 | 46 | 0.26 |
| 31 | 46 | 0.26 |
| 32 | 46 | 0.26 |
| 33 | 30 | 0.58 |
| 34 | 21 | 0.21 |
| 35 | 28 | 0.20 |
| 36 | 24 | 0.58 |

Underlined values: do not match the targeted values.
LME index = C % + Si %/4,

In trials 19, 20, 21, 33, 34, 35 and 36, the chemical composition does not allow to obtain the targeted weldability properties of the invention.

What is claimed is:

1. A hot rolled and heat-treated steel sheet, made of a steel having a composition comprising, by weight percent:

C: 0.03-0.18%

Mn: 6.0-11.0%

Mo: 0.05-0.5%

B: 0.0005-0.005%

S≤0.010%

P≤0.020%

N≤0.008% and optionally one or more of the following elements:

Al<3%

Si≤1.20%

Ti≤0.050%

Nb≤0.050%

Cr≤0.5% a remainder of the composition being iron and unavoidable impurities resulting from processing, said steel sheet having a microstructure comprising, in surface fraction, from 10% to 60% of retained austenite, from 40% to 90% of ferrite, less than 5% of martensite, carbides below 0.8%, and an inhomogeneous repartition of manganese, defined by a manganese distribution with a slope above or equal to −40.

2. The hot rolled and heat-treated steel sheet as recited in claim 1 wherein the steel sheet includes 0.6% or less of carbides.

3. The hot rolled and heat-treated steel sheet as recited in claim 2 wherein the steel sheet includes 0.5% or less of carbides.

4. The hot rolled and heat-treated steel sheet as recited in claim 1 wherein the carbon content is from 0.05% to 0.15%.

5. The hot rolled and heat-treated steel sheet as recited in claim 1 wherein the manganese content is from 6.0% to 9.0%.

6. The hot rolled and heat-treated steel sheet as recited in claim 1 wherein the aluminium content is from 0.2% to 2.5%.

7. The hot rolled and heat-treated steel sheet as recited in claim 1 wherein the Charpy impact energy at 20° C. is higher than 0.4 J/mm$^2$.

8. The hot rolled and heat-treated steel sheet as recited in claim 7 wherein the microstructure includes from 30% to 60% of retained austenite.

9. The hot rolled and heat-treated steel sheet as recited in claim 1 wherein the LME index is 0.36 or less.

10. The hot rolled and heat-treated steel sheet as recited in claim 1 wherein the steel has a carbon equivalent Ceq lower than 0.4, the carbon equivalent being defined as $$Ceq = C\% + Si\%/55 + Cr\%/20 + Mn\%/19 - Al\%/18 + 2.2P\% - 3.24B\% - 0.133 \times Mn\% \times Mo\%$$ with elements being expressed by weight percent.

11. The hot rolled and heat-treated steel sheet as recited in claim 1 wherein the microstructure includes 0% martensite.

12. The hot rolled and heat-treated steel sheet as recited in claim 1 wherein the microstructure includes carbides.

13. The hot rolled and heat-treated steel sheet as recited in claim 1 wherein the microstructure includes from 26% to 60% of retained austenite.

14. The hot rolled and heat-treated steel sheet as recited in claim 1 wherein the microstructure includes from 30% to 60% of retained austenite.

15. A resistance spot weld of two steel parts made of the hot rolled and heat-treated steel sheet as recited in claim 1, the resistance spot weld having an α value of at least 30 daN/mm$^2$.

* * * * *